(12) United States Patent
Seki et al.

(10) Patent No.: US 8,015,295 B2
(45) Date of Patent: Sep. 6, 2011

(54) COMMUNICATION SYSTEM, COMMUNICATION DEVICE, PROGRAM AND COMMUNICATION METHOD

(75) Inventors: Yasuharu Seki, Tokyo (JP); Kenji Shibata, Tokyo (JP); Takayuki Kori, Kanagawa (JP); Tatsuya Konno, Tokyo (JP); Rui Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 487 days.

(21) Appl. No.: 11/846,918

(22) Filed: Aug. 29, 2007

(65) Prior Publication Data

US 2008/0086536 A1 Apr. 10, 2008

(30) Foreign Application Priority Data

Oct. 4, 2006 (JP) .................................. 2006-273285

(51) Int. Cl.
*G06F 15/16* (2006.01)
(52) U.S. Cl. ........................... 709/227; 711/162; 710/74
(58) Field of Classification Search .................. 709/227
See application file for complete search history.

(56) References Cited

U.S. PATENT DOCUMENTS

| | | | |
|---|---|---|---|
| 6,272,605 B1 * | 8/2001 | Le et al. ........................ | 711/151 |
| 6,956,818 B1 * | 10/2005 | Thodiyil ........................ | 370/230 |
| 7,380,032 B2 * | 5/2008 | Innan et al. ..................... | 710/74 |
| 2002/0159304 A1 | 10/2002 | Morita et al. | |
| 2003/0115433 A1 * | 6/2003 | Kodama ......................... | 711/162 |
| 2005/0165898 A1 | 7/2005 | Morita et al. | |

FOREIGN PATENT DOCUMENTS

JP 2001-175624 6/2001

* cited by examiner

*Primary Examiner* — Yves Dalencourt
(74) *Attorney, Agent, or Firm* — Oblon, Spivak, McClelland, Maier & Neustadt, L.L.P.

(57) ABSTRACT

In a communication system comprising a communication device and a reproduction device capable of carrying out data communication with the communication device, the reproduction device includes a first storage unit in which content data are stored and a first communication unit engaged in data communication with the communication device, whereas the communication device in the communication system includes a second storage unit in which content data are stored, a second communication unit engaged in data communication with the first communication unit and a priority ranking determining unit that, based upon information obtained through the data communication and a priority ranking criterion, determines priority rankings for individual sets of content data in a content data group that includes both the content data stored in the first storage unit and the content data stored in the second storage unit.

25 Claims, 10 Drawing Sheets

FIG.4

| CONTENT ID | TITLE | NUMBER OF REPRODUCTIONS | RECORDING DATE | DELETE OK/NG | USER INPUT PRIORITY LEVEL | RATING | SIZE (GB) |
|---|---|---|---|---|---|---|---|
| 8704 | BASIC MATHEMATICS #2 | 0 | 2006/10/02 | OK |  | ☆☆ | 0.9 |
| 4843 | CHAMPION LEAGUE | 0 | 2006/10/03 | OK | ☆☆☆☆ | ☆☆☆☆ | 2.8 |
| 8701 | BASIC MATHEMATICS #1 | 3 | 2006/09/12 | OK | ☆☆☆ | ☆☆☆ | 0.9 |
| 6719 | ROMANCE - 19th INSTALLMENT | 0 | 2006/10/06 | OK | ☆☆☆☆ | ☆☆ | 1.4 |
| ⋯⋯ | ⋯⋯ | ⋯⋯ | ⋯⋯ | ⋯⋯ | ⋯⋯ | ⋯⋯ | ⋯⋯ |

FIG.5

| CONTENT ID | TITLE | NUMBER OF REPRODUCTIONS | DELIVERY DATE | DELETE OK/NG | USER INPUT PRIORITY LEVEL | RECOMMENDATION LEVEL | SIZE (GB) |
|---|---|---|---|---|---|---|---|
| 8702 | BASIC MATHEMATICS #2 | 2 | 2006/09/19 | OK | ☆☆☆ | ☆☆☆ | 0.9 |
| 8703 | BASIC MATHEMATICS #3 | 0 | 2006/09/25 | OK | | ☆☆☆ | 0.9 |
| 4842 | WORLD CUP SOCCER | 4 | 2006/07/11 | NG | ☆☆☆☆☆ | ☆☆☆☆ | 2.8 |
| 6701 | ROMANCE - 1st INSTALLMENT | 1 | 2006/04/07 | OK | ☆☆☆☆ | ☆☆ | 1.4 |
| 6702 | ROMANCE - 2nd INSTALLMENT | 1 | 2006/04/14 | NG | ☆☆☆☆ | ☆☆ | 1.4 |
| ........ | ........ | ........ | ........ | ........ | ........ | ........ | ........ |

FIG.8

| PRIORITY RANKING | CONTENT ID | TITLE | NUMBER OF REPRODUCTIONS | DELIVERY DATE | DELETE OK/NG | SIZE (GB) |
|---|---|---|---|---|---|---|
| 1 | 4842 | WORLD CUP SOCCER | 4 | 2006/07/11 | NG | 2.8 |
| 2 | 6702 | ROMANCE - 2nd INSTALLMENT | 1 | 2006/04/14 | NG | 1.4 |
| 3 | 6719 | ROMANCE - 19th INSTALLMENT | 0 | 2006/10/06 | OK | 1.4 |
| 4 | 4843 | CHAMPION LEAGUE | 0 | 2006/10/03 | OK | 2.8 |
| 5 | 8704 | BASIC MATHEMATICS #4 | 0 | 2006/10/02 | OK | 0.9 |
| 6 | 8703 | BASIC MATHEMATICS #3 | 2 | 2006/09/25 | OK | 0.9 |
| 7 | 8702 | BASIC MATHEMATICS #2 | 3 | 2006/09/19 | OK | 0.9 |
| 8 | 8701 | BASIC MATHEMATICS #1 | 1 | 2006/09/12 | OK | 0.9 |
| 9 | 6701 | ROMANCE - 1st INSTALLMENT | | 2006/04/07 | OK | 1.4 |

FIG.9

| CONTENT ID | TITLE | NUMBER OF REPRODUCTIONS | DELIVERY DATE | DELETE OK/NG | USER INPUT PRIORITY LEVEL | RECOMMENDATION LEVEL | SIZE (GB) |
|---|---|---|---|---|---|---|---|
| 8702 | BASIC MATHEMATICS #2 | 2 | 2006/09/19 | OK | ☆☆ | ☆☆☆ | 0.9 |
| 8703 | BASIC MATHEMATICS #3 | 0 | 2006/09/25 | OK |  | ☆☆☆ | 0.9 |
| 6701 | ROMANCE - 1$^{th}$ INSTALLMENT | 1 | 2006/04/07 | OK | ☆☆☆☆ | ☆☆ | 1.4 |

FIG.10

| CONTENT ID | TITLE | NUMBER OF REPRODUCTIONS | DELIVERY DATE | DELETE OK/NG | USER INPUT PRIORITY LEVEL | RECOMMENDATION LEVEL | SIZE (GB) |
|---|---|---|---|---|---|---|---|
| 8704 | BASIC MATHEMATICS #4 | 0 | 2006/10/02 | OK | | ☆☆☆ | 0.9 |
| 4843 | CHAMPION LEAGUE | 0 | 2006/10/03 | OK | ☆☆☆☆ | ☆☆☆☆ | 2.8 |
| 6719 | ROMANCE - 19th INSTALLMENT | 0 | 2006/10/06 | OK | ☆☆☆☆ | ☆☆ | 1.4 |

COMMUNICATION SYSTEM, COMMUNICATION DEVICE, PROGRAM AND COMMUNICATION METHOD

CROSS REFERENCE TO RELATED APPLICATION

The present invention contains subject matter related to Japanese Patent Application JP 2006-273285 filed in the Japan Patent Office on Oct. 4, 2006, the entire contents of which are incorporated herein by reference

BACKGROUND OF THE INVENTION

1. Field of the Invention

The present invention relates to a communication system, a communication device, a program and a communication method.

2. Description of the Related Art

Thanks to significant technological advances made in recent years, a PC (personal computer) and a portable reproduction device are now able to share content data such as visual data or audio data by exchanging the content data.

More specifically, the PC obtains content data transferred from an external apparatus or through automatic download executed by using an RSS (rich site summary) reader. Then, the PC decodes as necessary a specific set of transfer candidate content data to be transferred to the reproduction device among the content data it has obtained and transfers the decoded content data to the reproduction device. Thus, the content data having been obtained by the PC can also be utilized at the reproduction device.

An automatic transfer method whereby as a PC connected to a reproduction device obtains transfer-candidate content data to be transferred to the reproduction device, the content data are automatically transferred to the reproduction device is disclosed, for example, in Japanese Patent Application Publication No. 2001-175624. This automatic transfer method is advantageous in that the PC is able to automatically transfer the content data to the reproduction device without requiring the user to operate the PC.

SUMMARY OF THE INVENTION

If transfer-candidate content data having been obtained in the PC, are simply transferred to the reproduction device automatically as in the automatic transfer method in the related art described above, existing content data which the user does not intend to delete may become deleted at the reproduction device as the new content data are transferred since the data capacity of the reproduction device is limited.

Accordingly, an object of the present invention, having been completed by addressing the issue of the related art discussed above, is to provide a new and improved communications system, a new and improved communication device, a new and improved program and a new and improved communication method, with which the priority rankings of various sets of content data stored in a communication device such as a PC and in a reproduction device can be determined in an integrated, comprehensive manner.

According to an embodiment of the present invention, there is provided a communication system comprising a communication device and a reproduction device capable of carrying out data communication with the communication device. The reproduction device in the communication system includes a first storage unit in which content data are stored and a first communication unit engaged in data communication with the communication device, whereas the communication device in the communication system includes a second storage unit in which content data are stored, a second communication unit engaged in data communication with the first communication unit and a priority ranking determining unit that, based upon a priority ranking criterion used in conjunction with information obtained through data communication, determines priority rankings for individual sets of content data in a content data group that includes both the content data stored in the first storage unit and the content data stored in the second storage unit.

According to the embodiment of the present invention described above, the priority rankings for the various sets of content data stored in the communication device and the reproduction device can be determined in a comprehensive manner.

BRIEF DESCRIPTION OF THE DRAWINGS

FIG. 4 is additional information related to the individual sets of content data stored in the storage unit at the PC;

FIG. 5 is additional information related to the individual sets of content data stored in the storage unit at the reproduction device;

FIG. 8 is a list of sets of additional information corresponding to the content data in the content data group;

FIG. 9 is a list of deletion target content data; and

FIG. 10 is a list of transfer target content data.

DETAILED DESCRIPTION OF THE PREFERRED EMBODIMENTS

Figure 1:
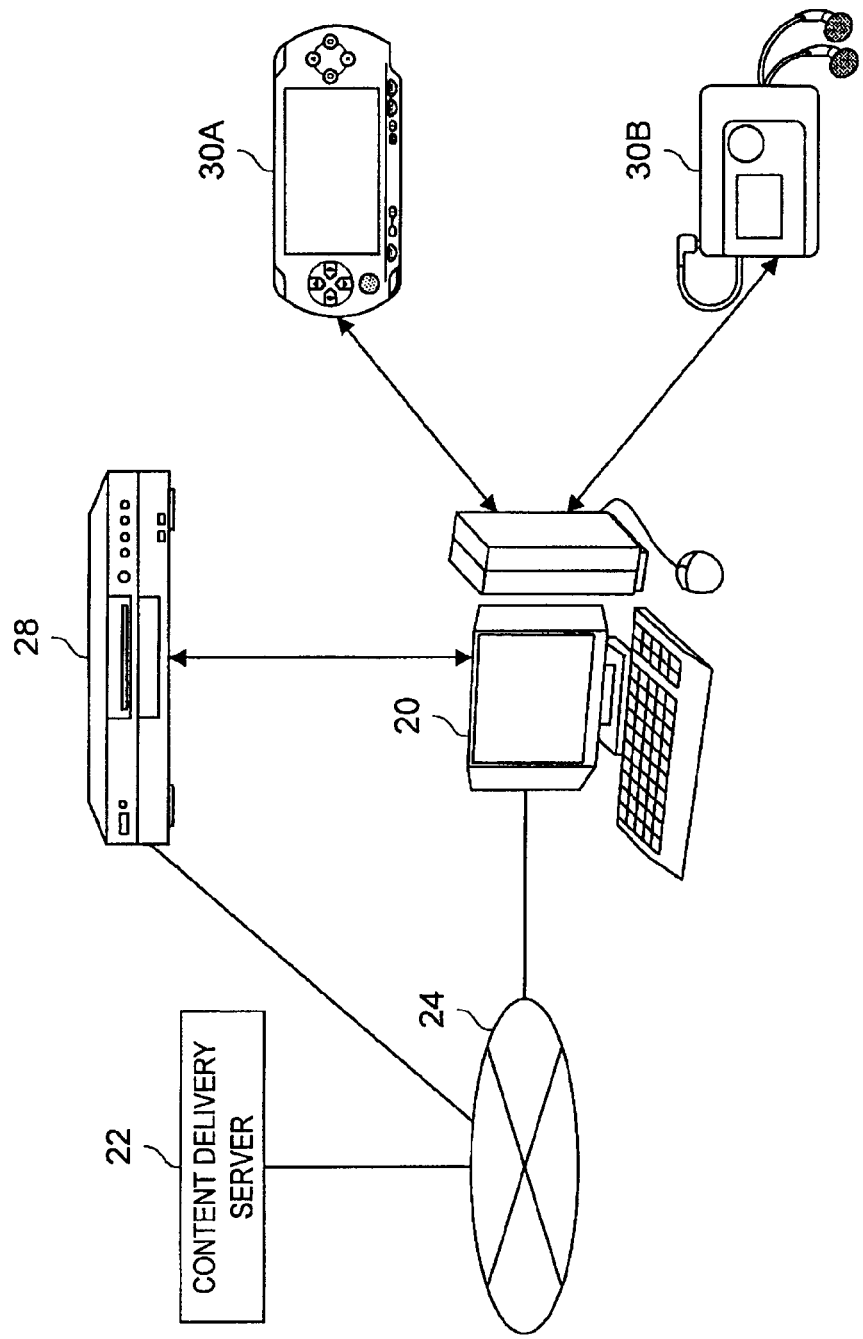
FIG. 1 is the configuration of the content transfer system achieved in an embodiment of the present invention.

Hereafter, a preferred embodiment of the present invention will be described in detail with reference to the appended drawings. Note that in this specification and the appended drawings, structural elements that have substantially the same function and structure are denoted with the same reference numerals and repeated explanation of these structural elements is omitted.

First, in reference to FIG. 1, a content transfer system 10 achieved in an embodiment of the present invention is briefly explained.

FIG. 1 shows the structure adopted in the content transfer system 10 in the embodiment. The content transfer system 10 is a communication system comprising a PC 20, a network 24, a DVD (digital versatile[1] disk) recorder 28 and reproduction devices 30.

[1] DVD is well-established term meaning "digital video disk"

The PC 20 functions as a communication device that transfers content data, obtained from an external storage device such as a content delivery server 22, the DVD recorder 28 or the like, to the reproduction device 30. The PC 20 preregisters specific content data at the content delivery server 22 connected via the network 24 so as to automatically download the particular content data as the content data are updated or newly registered at the content delivery server 22.

In addition, the PC 20 is able to obtain, automatically or in response to a user operation, content data stored in the DVD recorder 28 to which it is connected via a home network. It is to be noted that the DVD recorder 28 simply represents an example of an external storage device and the PC 20 may be connected to another type of external storage device such as another PC, a home image processing device, a portable telephone, a PHS (personal handy-phone system), a portable music reproduction device, a portable image processing device, a PDA (personal digital assistant), a home game console, a portable game device or a home appliance, instead.

The PC 20 is also able to obtain content data stored in a storage medium connected thereto and transferred from the storage medium. Such a storage medium may be, for instance, a nonvolatile memory such as an EEPROM (electrically erasable programmable read-only memory), an EPROM (erasable programmable read-only memory) or the like, a magnetic disk such as a hard disk or a floppy (registered trademark) disk, an optical disk such as a CD-R/RW (recordable/rewritable compact disk), DVD-R (recordable digital versatile disk)/RW/+R/+RW/RAM (random access memory) or a BD (Blue Ray disk (registered trademark))–R/BD–RE, or an MO (magneto-optical) disk.

The PC 20 in the embodiment is able to automatically transfer content data obtained as described above to the reproduction device 30 based upon a priority ranking criterion to be to described in detail later.

The reproduction device 30 is capable of storing the content data automatically transferred from the PC 20 into its internal storage unit or a storage medium loaded therein, in which content data can be stored. The reproduction device 30 structured as described above is able to automatically update the content data stored therein without requiring a user operation. The reproduction device 30 is also capable of reproducing content data having been transferred from the PC 20.

It is to be noted that while FIG. 1 shows a reproduction device 30A constituted with a PlayStation portable (registered trademark) and a reproduction device 30B constituted with a portable image reproduction device, they simply represent examples of reproduction devices 30. A reproduction device 30 may be, for instance, an information processing device such as a PC, home image processing device, a PHS, a portable music reproduction device, a portable image processing device, a PDA, a home game console, a portable game device or a home appliance.

Likewise, the PC 20 constituting the communication device in FIG. 1 simply represents an example and an information processing device having a function of obtaining content data and a function of transferring content data may be used as the communication device.

In addition, the content data obtained by the PC 20 and then transferred from the PC 20 to the reproduction device 30 represent "data" as a concept and may be, for instance, audio data constituted with music recordings, lecture recordings or radio program recordings, image data of motion pictures, television programs, video programs, photographs, paintings or graphics, games or software programs.

Figure 2:
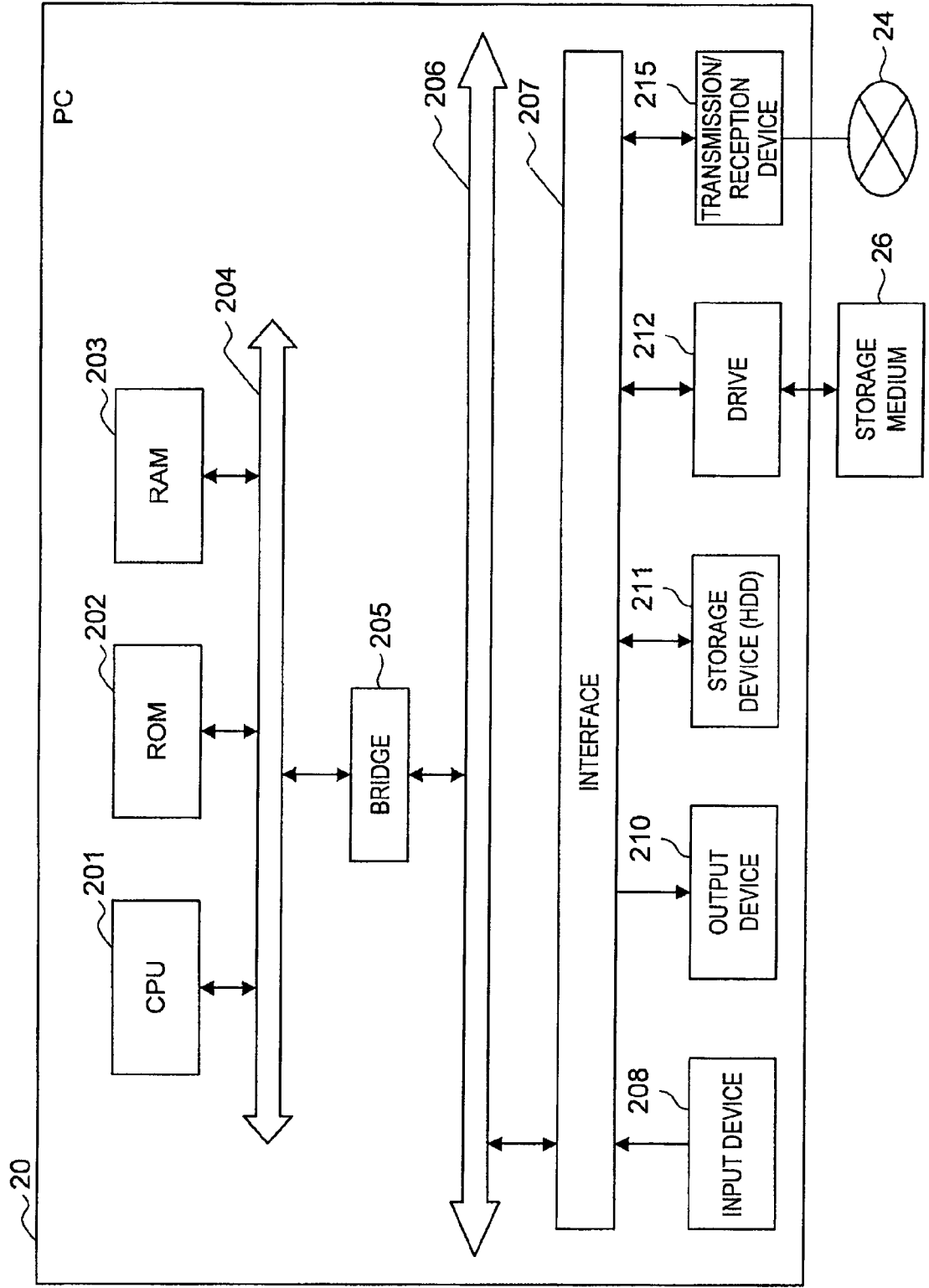
FIG. 2 is the hardware structure adopted in the PC in the embodiment.

Next, in reference to FIG. 2, the hardware configuration adopted in the PC 20 in the embodiment is explained.

FIG. 2 shows the hardware configuration adopted in the PC 20 in the embodiment. The PC 20 comprises a CPU (central processing unit) 201, a ROM (read-only memory) 202, a RAM (random access memory) 203, a host bus 204, a bridge 205, an external bus 206, an interface 207, an input device 208, an output device 210, a storage device (HDD) 211, a drive 212 and a transmission/reception device 215.

The CPU 201, which functions as an arithmetic processing device and a control device, controls the overall operations executed in the PC 20 in conformance to various programs. In addition, the CPU 201 may be constituted with a microprocessor. The programs, the arithmetic operation parameters and the like used by the CPU 201 are stored in the ROM 202. A specific program to be used by the CPU 201 during the execution of an operation, parameters that change as the operation is executed and the like are temporarily stored in the RAM 203. The components are connected with one another via the host bus 204 constituted with, for instance, a CPU bus.

The host bus 204 is connected to the external bus 206 such as a PCI (peripheral component interconnect/interface) bus via the bridge 205.

The input device 208 may be constituted with, for instance, an operation means operated by the user such as a mouse, a keyboard, a touch panel, a button, a switch and a lever, an input control circuit that generates an input signal in response to a user operation and outputs the input signal thus generated to the CPU 201, and the like. The user of the PC 20 is able to input various types of data to the PC 20 and issue processing operation instructions to the PC 20 by operating the input device 208.

The output device 210 is constituted with, for instance, an indicator device such as a CRT (cathode ray tube) display device, a liquid crystal display (LCD) device or a lamp and an audio output device such as a speaker or a headphone. The output device 210 outputs reproduced content data. More specifically, the various types of information such as reproduced image data may be displayed as text information or as an image at the indicator device. The audio output device, on the other hand, converts reproduced audio data and the like to audio and outputs the conversion result as sound.

The storage device 211, which is a data storage device representing an example of the storage unit in the PC 20 in the embodiment, may include a storage medium, a recording device that records data into the storage medium, a read device that reads out data from the storage medium and a delete device that deletes data recorded in the storage medium. The storage device 211 may be, for instance, an HDD (hard disk drive). The storage device 211 stores the programs executed by the CPU 201, various types of data used by the CPU 201, a single priority ranking criterion or a plurality of priority ranking criteria to be detailed later, additional information, content data and the like by driving a hard disk.

The drive 212, which is a reader/writer used in conjunction with the storage medium, is provided as an internal drive in the PC 20 or as a peripheral drive. The drive 212 reads out information recorded in a storage medium 26 such as a magnetic disk, an optical disk, a magneto-optical disk or a semiconductor memory loaded therein or connected thereto and outputs the information thus read out to the RAM 203.

The transmission/reception device 215 is a communication interface constituted with, for instance, a communication device through which the PC is connected with the network 24. The transmission/reception device 215 may be a wireless LAN (local area network) communication device, a wireless USB communication device or a wired communication device that executes wired communication. Such a transmission/reception device 215 obtains content data from the content delivery server 22 via the network 24, obtains content data from the DVD recorder 28 via the home network and transfers content data to a reproduction device 30 connected to the PC.

Figure 3:
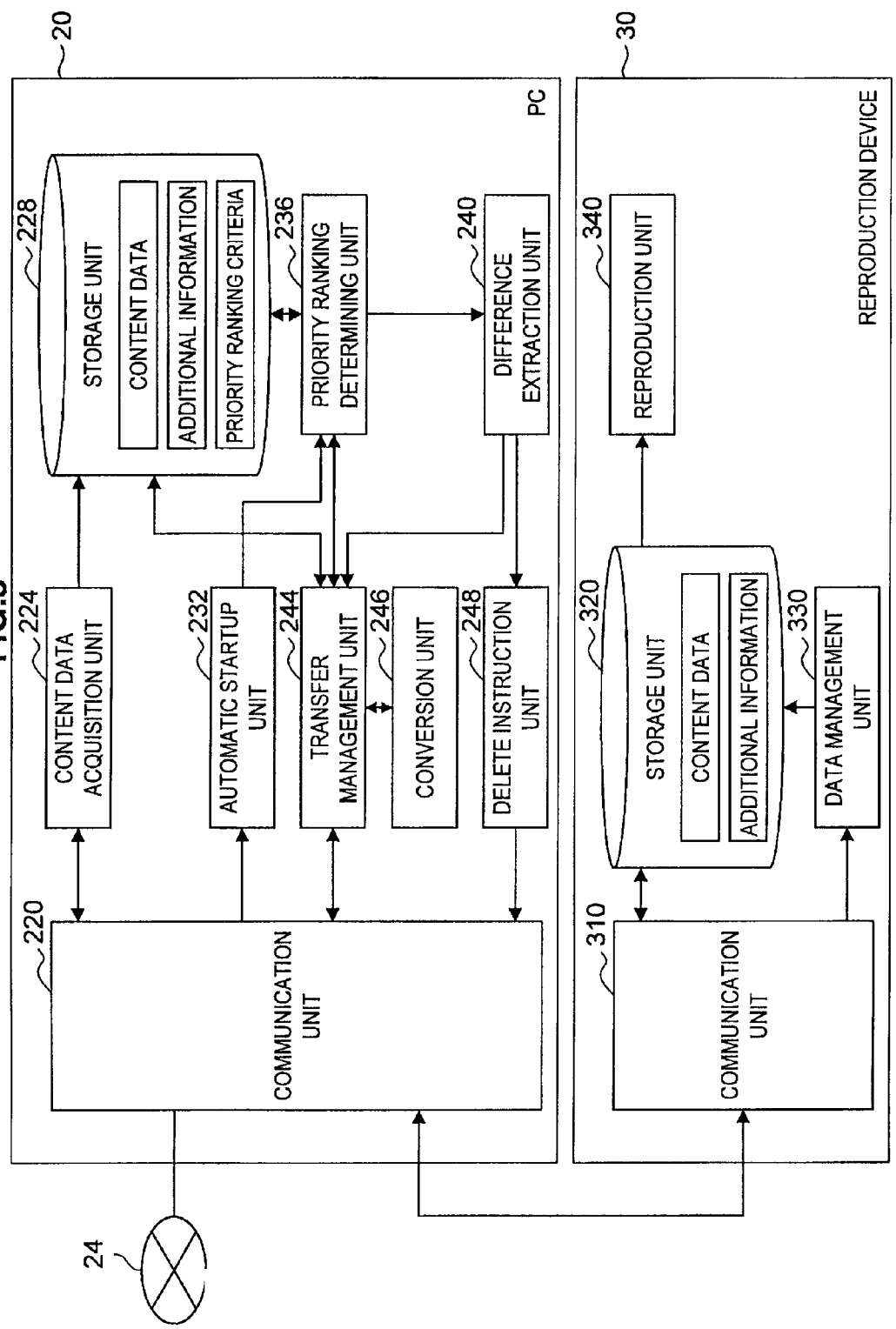
FIG. 3 is a block diagram showing the structures adopted in the PC and the reproduction device in the embodiment.

Next, in reference to FIG. 3, the functions of the PC 20 and the reproduction devices 30 constituting the content transfer system 10 in the embodiment are explained.

FIG. 3 is a block diagram showing the structure adopted in the PC 20 and a reproduction device 30 in the embodiment. The PC 20 comprises a communication unit 220, a content data acquisition unit 224, a storage unit 228, an automatic startup unit 232, a priority ranking determining unit 236, a difference extraction unit 240, a transfer management unit 244, a conversion unit 246 and a delete instruction unit 248, whereas the reproduction device 30 comprises a communication unit 310, a storage unit 320, a data management unit 330 and a reproduction unit 340.

The communication unit 220 functions as an interface or as a second communication unit for the PC 20 when the PC 20 exchanges various types of data with the content delivery server 22, an external storage device and the like. In addition, the communication unit 220 functions as a first communication unit when it is engaged in data communication with the communication unit 310 at the reproduction device 30. The operational functions of the communication unit 220 may be fulfilled by the transmission/reception device 215 shown in FIG. 2. In addition, the various types of data include content data, additional information with regard to the content data, a content data delivery request for the content delivery server 22 and RSS information written in the RSS format, in which meta-data such as website headers and update information are written. Furthermore, the communication unit 220 may adopt a structure that allows it to execute wired data communication, wireless USB communication or wireless LAN (local area network) communication.

The content data acquisition unit 224 is capable of automatically downloading content data from the content delivery server 22 into the storage unit 228 via the communication unit 220. The content acquisition unit 224 makes a decision as to whether or not content data set in advance by the user have been updated or newly registered by, for instance, obtaining RSS information related to the content data at the content delivery server 22. The content data acquisition unit 224 may obtain the RSS information from the content delivery server 22 on a regular basis or with predetermined intervals, or the relevant RSS information may be automatically transmitted from the content delivery server 22 when the preset content data are updated or newly registered.

Then, if it is decided, based upon the RSS information obtained as described above, that the preset content data have been updated or newly registered, the content data acquisition unit 224 issues a request for the content data to the content delivery server 22 and downloads the content data.

In addition, the content acquisition unit 224 is able to obtain content data from an external storage device such as the DVD recorder 28 or a storage medium such as a CD or a flash memory. The content data acquisition unit 224 then functions as a recording unit which records the obtained content data into the storage unit 228.

The storage unit 228, which may be constituted with, for instance, a hard disk (the storage device shown in FIG. 2) or a storage medium such as that described earlier, functions as a storage medium or a second storage unit in which content data are stored. For instance, content data obtained by the content data acquisition unit 224 through RSS automatic download, content data obtained by the content data acquisition unit 224 from the DVD recorder 28 via the home network, content data obtained from a storage medium are stored into the storage unit 228. In addition, the storage unit 228 is capable of functioning as a criteria storage unit in which a single priority ranking criterion or a plurality of priority ranking criteria to be detailed later are stored. It is to be noted that the storage unit for storing content data and the storage unit for storing the priority ranking criterion (criteria) may be physically separate units or they may be constituted as an integrated unit.

Additional information indicating the genre, the length and the like of each set of content data can also be stored in the storage unit 228. An example of additional information that may be stored in the storage unit 228 is now explained in reference to FIG. 4.

FIG. 4 shows the additional information related to various sets of content data stored in the storage unit 228. The additional information in the example presented in FIG. 4 indicates a content ID, a title, the number of reproductions, the recording date, delete OK/NG, a user input priority level, a rating and a size.

The content ID is identification information provided so as to enable identification of each set of content data. The title is assigned to each set of content data. The size refers to the data size of each set of content data. As in this example, the additional information may include inherent information indicating the content ID, the title, the size and the like inherent to each set of content data.

The number of reproductions indicates the number of times the corresponding content data have been reproduced at the PC 20 and/or the reproduction device 30. The recording date indicates the date at which the content data were recorded into the storage unit 228. Namely, the additional information may include history information such as the number of reproductions or the delivery date, indicating the history of processing that the content data have undergone at the PC 20 and/or the reproduction device 30.

The delete OK/NG indicates whether or not content data deletion is disallowed. "delete OK" or "delete NG" can be set by the user. Alternatively, "delete OK" allowing deletion of the content data may be on when the content data are obtained and subsequently, the user may select "delete NG" to disallow deletion of the particular content data as necessary.

The user input priority level indicates the priority level of the subject content data set by the user. For instance, the user is able to set a high priority for favorite content data and set a lower priority for content data that do not interest him much. The user input priority level may assume a fixed value when the content data are obtained and then the user may set a specific priority level as necessary. Or, content data may be obtained before they are assigned with priority levels and, in such a case, the user may set a specific priority level for each set of newly obtained content data. It is to be noted that while the priority level of a given set of content data is indicated by a specific number of stars in the example presented in FIG. 4, priority levels may be indicated by numerical values or they may be ranked "S", "A", "B" and the like, instead.

As described above, the additional information may include users setting information indicating settings selected by the user for each set of content data, e.g., the delete OK/NG and the user input priority level.

The rating is information on objective evaluation of the content data, which is obtained via the network 24. For instance, the rating information may represent the average of personal evaluations of the content data input by a plurality of reviewers. In addition, while the rating for each set of content data is indicated by a specific number of stars in the example presented in FIG. 4, ratings may be indicated by numerical values or they may be indicated in a letter-based ranking system using letters such as "S", "A", "B" and the like. In short, the additional information may include content data-related information obtained by the PC 20 or the reproduction device 30 via the network 24.

More specifically, the additional data for the content data with the content ID "8704" stored in the storage unit 228 in the example presented in FIG. 4 indicates that the title of the content data is "Basic Mathematics #4", that the number of reproductions is "0", that the recording date is "2006/10/02", that "delete OK" has been selected, that the user input priority level has not been set, that the content data are rated with three stars and that the content data size is "0.9" GB. In addition, the additional information for the content data with the content ID "4843" indicates that the content data title is "Champion League", that the number of reproductions is "0", that the recording date is "2006/10/03", that "delete OK" has been selected, that the user input priority level is "five stars", that the content data are rated with four stars and that the content data size is "2.8" GB. The additional information for the content data with the content ID "8701" indicates that the content data title is "Basic Mathematics #1", that the number of reproductions is "3", that the recording date is "2006/09/12", that "delete OK" has been selected, that the user input priority level is "three stars", that the content data are rated with three stars and that the content data size is "0.9" GB. The additional information for the content data with the content ID "6719" indicates that the content data title is "Romance 19th installment", that the number of reproductions is "1", that the recording date is "2006/10/06", that "delete OK" has been selected, that the user input priority level is "four stars", that the content data are rated with two stars and that the content data size is "1.4" GB.

The following explanation is given in reference to FIG. 3 again. The automatic startup unit 232 makes a decision as to whether or not a transfer function enabling content data transfer, which is achieved through cooperation of the priority ranking determining unit 236, the difference extraction unit 240 and the like, is active and activates the transfer function if the transfer function is determined to be currently inactive. The decision-making by the automatic startup unit 232 may be triggered as the reproduction device 30 becomes connected to the PC 20 or it may be triggered as the content data acquisition unit 224 obtains new content data.

The priority ranking determining unit 236 determines the priority rankings of the individual sets of content data in a content data group that includes both the content data stored in the storage unit 228 at the PC 20 and the content data stored in the storage unit 320 at the reproduction device 30. While the priority ranking determining process is to be described in detail later in reference to FIGS. 7 and 8, the priority ranking determining unit 236 first creates a list of the content data in the content data group by incorporating the content data stored in the storage unit 320 at the reproduction device 30 and the content data stored in the storage unit 228 at the PC 20. It then selects a specific priority ranking criterion among the priority ranking criteria stored in the storage unit 228 and determines the priority ranking of each set of content data in the content data group in a comprehensive manner by referencing the additional information. It is to be noted that the priority ranking determining unit 236 may select the specific priority ranking criterion based upon a user operation.

Namely, the priority ranking criterion is a specific method or algorithm to be adopted when determining the priority rankings for the individual sets of content data and the priority ranking determining unit 236 may simply execute processing in conformance to the priority ranking criterion.

The difference extraction unit 240 extracts transfer target content data to be transferred to the reproduction device 30 from the various sets of content data stored in the storage unit 228, based upon the priority rankings of the content data determined by the priority ranking determining unit 236 and the capacity of the storage unit 320 at the reproduction device 30. In addition, it extracts deletion target content data to be deleted from the storage unit 320 at the reproduction device 30 having stored therein various sets of content data, based upon the priority rankings of the content data determined by the priority ranking determining unit 236 and the capacity of the storage unit 320 at the reproduction device 30. The operations executed by the difference extraction unit 240 are to be described in detail later in reference to FIG. 7 through 10.

The transfer management unit 244 transfers the transfer target content data having been extracted by the difference extraction unit 240 to the reproduction device 30 from the storage unit 228. Through cooperation with the conversion unit 246, the transfer management unit 244 is able to convert the transfer target content data into a data format compatible with the reproduction device 30. Such a data format may be an image compression format, e.g., JPEG (joint photographic coding experts group), MPEG 1, MPEG 2 or MPEG 4, or an audio data compression format, e.g., MP3 (MPEG 1 layer-3), AAC (advanced audio codec), WMA 9 (Windows media audio 9), ATRAC (adaptive transform acoustic coding) or ATRAC3.

In addition, the transfer management unit 244 may adopt a structure that allows it to receive content data from the reproduction device 30 and to exchange additional information related to content data with the reproduction device 30.

The delete instruction unit 248 issues an instruction for the reproduction device 30 to delete the deletion target content data having been extracted by the difference extraction unit 240. For instance, the delete instruction unit 248 may transmit to the reproduction device 30 a list of the deletion target content data having been extracted by the difference extraction unit 240 and issue an instruction for the reproduction device 30 to delete the content data included in the list.

The communication unit 310 functions as an interface or as a first communication unit that allows the reproduction device 30 to exchange various types of data with an external device such as the PC 20. The communication unit 310 receives content data or a delete instruction from the PC 20 and transmits additional information related to the content data stored in the storage unit 320 to the PC 20. Furthermore, the communication unit 310 may adopt a structure that allows it to execute wired data communication, wireless USB communication or wireless LAN (local area network) communication.

The storage unit 320, constituted with, for instance, a hard disk or a storage medium such as that described earlier, functions as a storage medium or as a first storage unit in which content data are stored. For instance, content data received via the communication unit 310 can be stored into the storage unit 320.

In addition, the additional information explained earlier can be stored in correspondence to individual sets of content data in the storage unit 320. An example of additional information that may be stored in the storage unit 320 is now explained in reference to FIG. 5.

FIG. 5 shows the additional information related to various sets of content data stored in the storage unit 320. The additional information in the example presented in FIG. 5 indicates the content ID, the title, the number of reproductions, the recording date, the delete OK/NG, the user input priority level, the rating and the size.

More specifically, the additional information for the content data with the content ID "8702" stored in the storage unit 320 in the example presented in FIG. 5 indicates that the title of the content data is "Basic Mathematics #2", that the number of reproductions is "2", that the recording date is "2006/09/19", that "delete OK" has been selected, that the user input priority level is "three stars", that the content data are rated with three stars and that the content data size is "0.9" GB. The additional information for the content data with the content ID "8703" indicates that the title of the content data is "Basic Mathematics #3", that the number of reproductions is "0", that the recording date is "2006/09/25", that "delete OK" has been selected, that the user input priority level has not been set, that the content data are rated with three stars and that the content data size is "0.9" GB. In addition, the additional information for the content data with the content ID "4842" indicates that the content data title is "World Cup Soccer", that the number of reproductions is "4", that the recording date is "2006/07/11", that "delete NG" has been selected, that the user input priority level is "five stars", that the content data have been rated with four stars and that the content data size is "2.8" GB. The additional information for the content data with the content ID "6701" indicates that the content data title is "Romance—1st installment", that the number of reproductions is "1", that the recording date is "2006/04/07", that "delete OK" has been selected, that the user input priority level is "four stars", that the content data are rated with two stars and that the content data size is "1.4" GB. The additional information for the content data with the content ID "6702" indicates that the content data title is "Romance—2nd installment", that the number of reproductions is "1", that the recording date is "2006/04/14", that "delete NG" has been selected, that the user input priority level is "four stars", that the content data are rated with two stars and that the content data size is "1.4" GB.

To resume the explanation given in reference to FIG. 3, the data management unit 330 manages the data stored in the storage unit 320. For instance, the data management unit 330 functions as a recording unit that records content data transferred from the PC 20 into the storage unit 320. The data management unit 330 also functions as a deletion management unit that deletes from the storage unit 320 content data for which a delete instruction has been issued from the PC 20.

The reproduction unit 340 reads out content data stored in the storage unit 320 and reproduces the content data thus read out. If the content data are digital data, the reproduction operation may include processing for converting the digital content data to analog data and transmitting the content data having undergone the D/A conversion to an output device such as a display and/or a speaker, whereas if the content data are analog data, the reproduction operation may include processing for transmitting the content data to the output device.

It is to be noted that while the difference extraction unit 240 at the PC 20 issues an instruction indicating the deletion target content data to the reproduction device 30 in the example presented in FIG. 3, the reproduction device 30 may include an extraction unit that extracts deletion target content data based upon the priority rankings of the individual sets of content data determined by the priority ranking determining unit 236 and the capacity of the storage unit 320, instead.

In addition, functions equivalent to operational functions of the content data acquisition unit 224, the automatic startup unit 232, the priority ranking determining unit 236, the difference extraction unit 240, the transfer management unit 244, the conversion unit 246 and the delete instruction unit 248 may be fulfilled in hardware, e.g., the CPU 201, the ROM 202 and the RAM 203 in FIG. 2, based upon a computer program that enables a computer to execute the operations of the individual functional units. Likewise, the operations executed in the data management unit 330 and the reproduction unit 340 at the reproduction device 30 can be executed in hardware based upon a computer program.

Next, a communication method that may be adopted in the content transfer system 10 constituted with the PC 20 and reproduction devices 30, the functions of which have been described above, is explained in reference to FIGS. 6 through 10.

Figure 6:
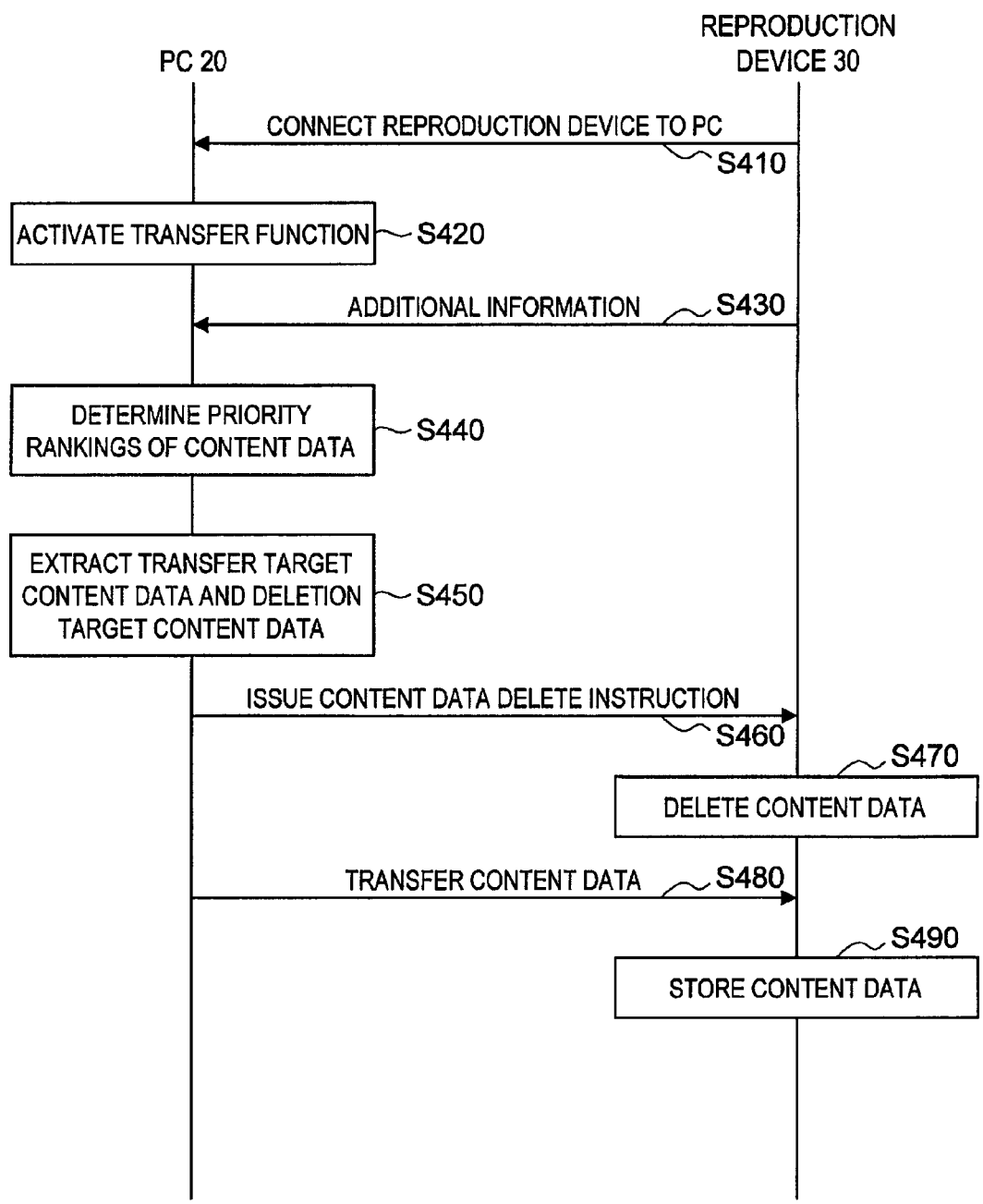
FIG. 6 is a schematic sequence diagram of the communication method adopted in conjunction with the PC in the embodiment.

FIG. 6 is a schematic sequence diagram of the operations of the content transfer system 10 and the communication method adopted in conjunction with the PC 20 in the embodiment. A reproduction device 30 is first connected to the PC 20 (S410). Next, the PC 20 activates (starts up) the transfer function (S420). The term "transfer function" in this context refers to a function engaged to transfer content data from the PC 20 to the reproduction device 30, and such a function may be fulfilled at, for instance, the priority ranking determining unit 236, the difference extraction unit 240, the transfer management unit 244, the conversion unit 246 or the delete instruction unit 248.

Next, the reproduction device 30 transmits the additional information corresponding to the content data stored in the storage unit 320 to the PC 20 (S430). The PC 20, in turn, determines the priority rankings of the individual sets of content data in the content data group that includes both the content data stored at the PC 20 and the content data stored at the reproduction device 30, based upon additional information received from the reproduction device 30, additional information corresponding to the content data stored in the storage unit 228 and a priority ranking criterion used in conjunction with the additional information from the reproduction device 30 and the additional information corresponding to the content data in the storage unit 228 (S440).

Based upon the priority rankings of the individual sets of content data having been determined in S440 and the capacity of the storage unit 320 at the reproduction device 30, the PC 20 then extracts transfer target content data to be transferred to the reproduction device 30 from the various sets of content data stored in the storage unit 320 and also extracts deletion target content data to be deleted among the sets of content data stored in the storage unit 320 at the reproduction device 30 (S450).

The PC 20 next issues a delete instruction for the reproduction device 30 to delete the deletion target content data having been extracted in S450 (S460). In response, the reproduction device 30 deletes from the storage unit 320 the content data having been specified for deletion by the PC 20 (S470).

In addition, the PC 20 transfers the transfer target content data having been extracted in S450 to the reproduction device 30 (S480). The reproduction device 30, in turn, stores the content data transferred from the PC 20 into the storage unit 320 (S490).

It is to be noted that the storage device 30 can be connected to any PC 20 in the content transfer system 10 achieved in the embodiment. Namely, following the content data transfer/delete processing executed for the reproduction device 30 and a given PC 20, content data transfer/delete processing can be executed successfully for the reproduction device 30 and another PC 20.

Next, the priority ranking determining method and the transfer target/deletion target content data extraction method adopted in the PC 20 are explained in detail.

Figure 7:
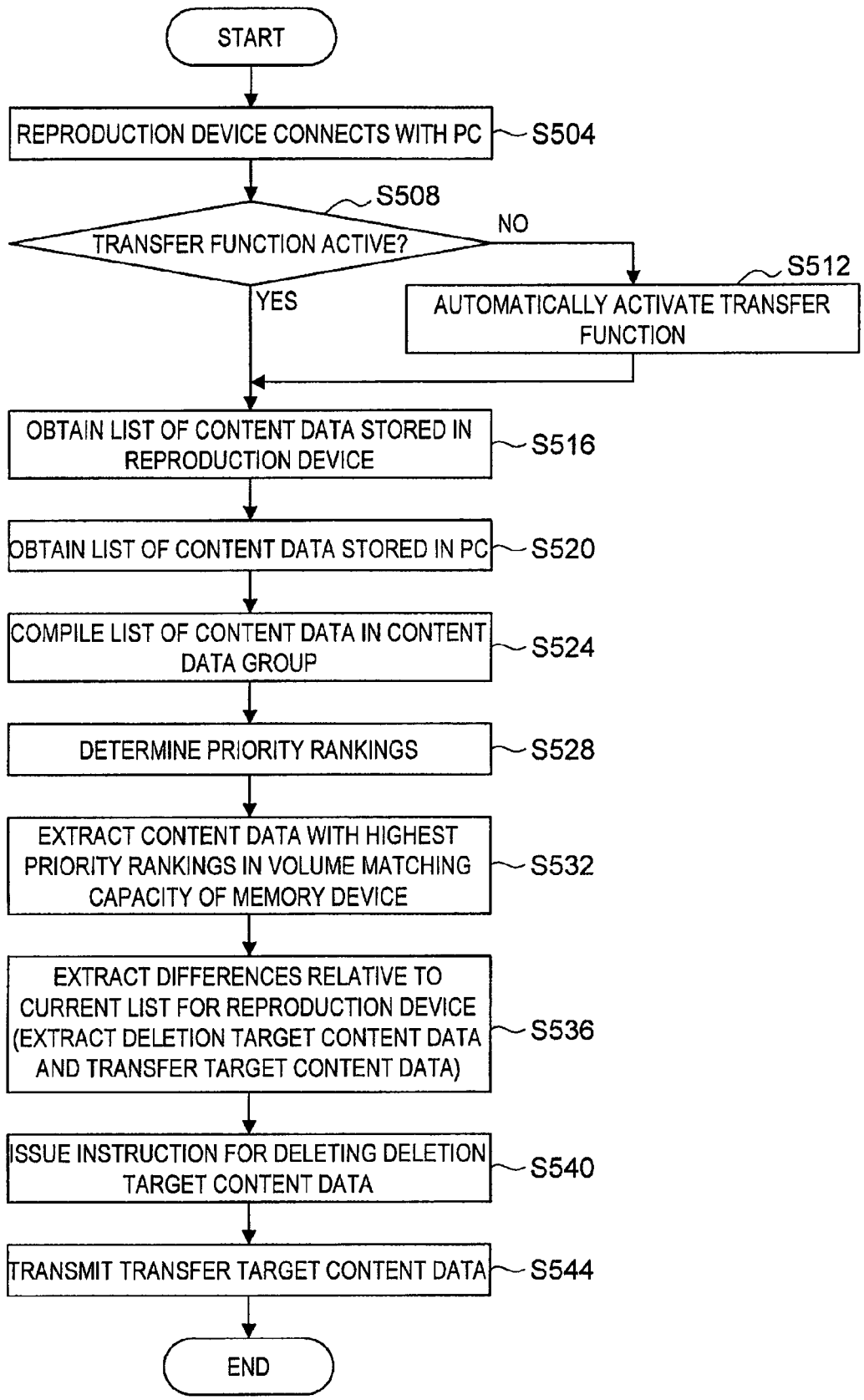
FIG. 7 is a detailed flowchart of the operations executed in the PC.

FIG. 7 presents a detailed flowchart of the operations executed in the PC 20. As the reproduction device 30 is connected to the communication unit 220 at the PC 20, the automatic startup unit 232 of the PC 20 makes a decision as to whether or not the transfer function is currently active at the PC 20 (S504, S508). If it is decided that the transfer function is not active at the PC 20, the automatic startup unit 232 automatically activates the transfer function (S512).

Following the processing executed in S508 or S512, the priority ranking determining unit 236 obtains a first list listing the sets of additional information corresponding to the content data stored at the reproduction device 30 (S516). In the following explanation, it is assumed that the first list thus obtained is identical to that shown in FIG. 5. Subsequently, the priority ranking determining unit 236 obtains a second list listing the sets of additional information corresponding to the content data stored at the PC 20 (S520). It is assumed that the second list is as shown in FIG. 4.

The priority ranking determining unit 236 compiles a list of the sets of additional information for the content data group by incorporating the first list and the second list (S524). The priority ranking determining unit 236 then determines the priority rankings of the individual sets of content data in the content data group based upon the selected priority ranking criterion by referencing the additional information corresponding to the various sets of content data in the content data group (S528).

An example of a priority ranking criterion that may be used is explained. The priority ranking determining unit 236 executing processing based upon the first priority ranking criterion rearranges the content data by checking whether or not "NG" is set for the "delete OK/NG" constituting first additional information. More specifically, the priority ranking determining unit 236 determines first priority rankings for the individual sets of content data by ranking a set of content data for which "NG" is set for the delete OK/NG higher than content data for which "OK" is set for the delete OK/NG.

Then, the priority ranking determining unit 236 rearranges sets of content data with their first priority rankings equal to one another based upon the values indicating the number of reproductions and constituting second additional information. More specifically, the priority ranking determining unit 236 determines second priority rankings for the individual sets of content data with first priority rankings equal to one another by ranking a set of content data with the corresponding number of reproductions indicating "0", i.e., a set of content data that has not been reproduced, higher than a set of content data having been previously reproduced. In addition, the priority ranking determining unit 236 may determine second priority rankings for the individual sets of content data with their first priority rankings equal to one another by ranking a set of content data with a smaller value indicating the number of reproductions higher than a set of content data with a greater value indicating the number of reproductions.

In addition, the priority ranking determining unit 236 rearranges sets of content data with their second priority rankings equal to one another based upon their recording dates constituting third additional information. More specifically, the priority ranking determining unit 236 determines third priority rankings for the individual sets of content data with their second priority rankings equal to one another by ranking a set of content data with a more recent recording date higher than a set of content data with an older recording date. The third priority rankings determined as described above can be designated as the ultimate priority rankings of the various sets of content data. FIG. 8 presents a third list listing sets of content data having been rearranged in correspondence to their final priority rankings.

As shown in FIG. 8, upon selecting the first priority ranking criterion, the priority ranking determining unit 236 awards the highest priority rankings to content data for which "NG" has been selected for the delete OK/NG, followed by content data with "0" indicated for the number of reproductions, which, in turn, are followed by other sets of content data prioritized so that content data with more recent recording dates ranked higher than content data with older recording dates.

More specifically, there are two sets of content data for which "NG" has been selected for the delete OK/NG with values other than "0" indicating the number of reproductions, i.e., "World Cup Soccer" and "Romance—$2^{nd}$ installment". Of these, "World Cup Soccer" with a more recent recording date is ranked first and "Romance—$2^{nd}$ installment" ranked second. Following these sets of content data, content data for which "OK" has been selected for the delete OK/NG with "0" indicating the number of reproductions are ranked by awarding a higher ranking to a set of content data with the more recent recording date. Namely, these sets of data are ranked in the order of; "Romance—$19^{th}$ installment" with a recording date "2006/10/06", "Champions League" with a recording date "2006/10/03", "Basic Mathematics #4" with a recording date "2006/10/02" and "Basic Mathematics #3" with a recording date "2006/09/25".

Under "Basic Mathematics #3", sets of content data for which "OK" has been selected for the delete OK/NG with values other than "0" each indicating the corresponding number of reproductions are ranked by awarding a higher ranking to a set of content data with a more recent recording date. Namely, they are ranked in the order of; "Basic Mathematics #2" with a recording date "2006/09/19", "Basic Mathematics #1" with a recording date "2006/09/12" and "Romance—$1^{st}$ installment" with a recording date "2006/04/07".

To resume the explanation given in reference to FIG. 7, the difference extraction unit 240 extracts content data with highest rankings awarded by the priority ranking determining unit 236 in a volume corresponding to the capacity of the storage unit 320 at the reproduction device 30 (S532). Hereafter, a list of the content data thus extracted is referred to as a fourth list. Accordingly, assuming that the capacity of the storage unit 320 at the reproduction device 30 is 10 GB, the content data with the highest ranking through the content data "Basic Mathematics #4" ranked fifth in FIG. 8 are extracted.

The difference extraction unit 240 compares the first list indicating the content data stored in the storage unit 320 at the reproduction device 30 with the fourth list and extracts the difference between them (S536). More specifically, the difference extraction unit 240 extracts content data included in the fourth list but not included in the first list as transfer target content data. In addition, the difference extraction unit 240 extracts content data included in the first list but not included in the fourth list as deletion target content data.

In more specific terms, the difference extraction unit 240 compares the first list shown in FIG. 5 with the fourth list listing the top five content data in the priority rankings in FIG. 8 and extracts the sets of content data in FIG. 9 as the deletion target content data. Likewise, the difference extraction unit 240 compares the first list with the fourth list and extracts the sets of content data in FIG. 10 as the transfer target content data.

Next, the delete instruction unit 248 issues an instruction for the reproduction device 30 to delete the deletion target content data, having been extracted by the difference extraction unit 240, from the storage unit 320 at the reproduction device 30 (S540). Subsequently, the transfer management unit 244, working in cooperation with the conversion unit 246 as necessary, reads out the transfer target content data, having been extracted by the difference extraction unit 240, from the storage unit 228 and transfers them to the reproduction device 30 (S544).

As described above, the priority ranking determining unit 236 executing the processing based upon the first priority ranking criterion is able to award higher rankings to content data that have not been reproduced by the user and award lower rankings to content data having been previously reproduced by the user. A given set of content data with a higher ranking is more likely to be transferred to the reproduction device 30 or to be retained at the reproduction device 30, whereas a set of content data with a lower ranking is more likely to remain un-transferred to the reproduction device 30 or more likely to be deleted from the reproduction device 30. Thus, as long as the user tends not to wish to reproduce content data again after initial reproduction, the adoption of the first priority ranking criterion described above assures efficient utilization of the capacity available at the memory unit 320 in the reproduction device 30, since content data that the user is less likely to wish to reproduce are alleviated from the reproduction device 30.

As an alternative, the priority ranking determining unit 236 may determine priority rankings based upon a second priority ranking criterion in conjunction with the delete OK/NG is used as the first additional information, the rating is used as the second additional information and the number of climaxes is used as the third additional information. The number of climaxes may indicate the number of climax scenes detected based upon, for instance, a climax detection algorithm. Since the number of climaxes indicates the contents of the subject content data as a specific value, it may be regarded as inherent information. If information indicating the number of climaxes is obtained via the network 24, the number of climaxes may be regarded as related information instead.

While the processing executed by the priority ranking determining unit 236 based upon such a second priority ranking criterion is substantially identical to the processing executed based upon the first priority ranking criterion and is not explained in detail, the priority ranking determining unit awards a higher ranking to a set of content data with a higher rating and awards a lower ranking to a set of content data with a lower rating based upon the second priority ranking criterion. A given set of content data with a higher ranking is more likely to be transferred to the reproduction device 30 or to be retained at the reproduction device 30, whereas a set of content data with a lower ranking is more likely to remain un-transferred to the reproduction device 30 or more likely to be deleted from the reproduction device 30. Accordingly, if the user tends to favor the type of content data enjoyed by a majority of people, the second priority ranking criterion is ideal since popular content data on the network 24 can be stored into the storage unit 320 at the reproduction device 30 by eliminating content data that the user is less likely to wish to reproduce from the reproduction device 30.

In addition, the priority ranking determining unit 236 may determine priority rankings based upon a third priority ranking criterion by using the deletion OK/NG as the first additional information and a combined index is used as the second additional information. The combined index may be information indicated by a numerical value determined by combining a plurality of types of additional information. For instance, the genre and the recording date may be combined so as to assume "the lowest value for news data once two days elapse following the recording date" as the combined index. Or the genre and the title may be combined to constitute the combined index so as to "reduce the numerical value for drama data once the next installment is recorded". As a further alternative, the genre and the rating may be combined to assume "a higher numerical value for comedy data while the rating remains high" for the combined index. In addition, content data appended with a first type of combined index and content data appended with another type of combined index determined by using additional information different from that used to determine the first type of combined index may be ranked relative to each other based upon the third priority criterion by enabling accurate comparison of the combined index values of the individual sets of content data through the use of, for instance, a predetermined function.

While the processing executed by the priority ranking determining unit 236 based upon such a third priority ranking criterion is substantially identical to the processing executed based upon the first priority ranking criterion and is not explained in detail, the priority ranking determining unit awards a higher ranking to a set of content data with a higher combined index value and awards a lower ranking to a set of content data with a lower combined index value based upon the third priority ranking criterion. A given set of content data with a higher ranking is more likely to be transferred to the reproduction device 30 or to be retained at the reproduction device 30, whereas a set of content data with a lower ranking is more likely to remain un-transferred to the reproduction device 30 or more likely to be deleted from the reproduction device 30. Accordingly, if, for instance, news data are to assume the lowest value once two days elapse following the recording date based upon the combined index, it can be ensured that only recent news programs are recorded in the storage unit 320 at the reproduction device 30 without recording any news data two days past the recording date.

As explained above, the content transfer system 10 achieved in the embodiment allows the reproduction device 30 to automatically delete content data stored therein and content data transferred from the PC 20 to be stored into the reproduction device 30, without requiring the user to operate the PC 20. Namely, as long as a specific priority ranking criterion to be used by the priority ranking determining unit 236 is selected, the content data stored in the reproduction device 30 can be updated without requiring the user to operate the PC 20 at all.

In addition, the PC 20 in the embodiment determines priority rankings of the individual sets of content data in the content data group that includes both the content data stored at the PC 20 and the content data stored at the reproduction device 30 and transfers content data to the reproduction device 30 or delete content data from the reproduction device 30 based upon the priority rankings thus determined. If, on the other hand, the priority rankings of the content data stored at the PC 20 and the priority rankings of the content data stored at the reproduction device 30 were determined separately, the priority levels of a given set of content data stored in the PC 20 and a given set of content data stored in the reproduction device 30 relative to each other could not be determined.

Accordingly, the PC 20 in the embodiment determines the priority rankings of all the sets of content data in the content data group that includes both the content data stored in the PC 20 and the content data stored in the reproduction device 30 so as to manage the priority rankings of all the sets of content data belonging to the user in a comprehensive manner.

In addition, a plurality of types of priority ranking criteria can be stored in the storage unit 228 at the PC 20 in the embodiment. Thus, the priority ranking determining unit 236 ranks various sets of content data based upon an optimal priority ranking criterion matching a content reproduction pattern of the particular user and, as a result, the content data optimized for the user can be stored in the reproduction device 30.

The priority ranking determining unit 236 in the embodiment is able to determine the priority rankings of the individual sets of content data in conformance to the priority ranking criterion by referencing the additional information related to the content data stored in the storage unit 228 and the additional information related to the content data stored in the storage unit 320.

Furthermore, the priority ranking determining unit 236 in the embodiment selects a specific priority ranking criterion among a plurality of priority ranking criteria stored in the storage unit 228 so as to determine the priority rankings of the individual sets of content data based upon the selected priority ranking criterion. This enables the PC 20 to determine the priority rankings of the content data based upon diverse priority ranking criteria.

In the embodiment, a given type of additional information is allowed to assume different standings in relation to the plurality of priority ranking criteria that may commonly use the particular additional information. As a result, the priority ranking determining unit 236 will be able to provide different content data priority rankings based upon the individual priority ranking criteria even when it determines priority rankings for the various sets of content data based upon priority ranking criteria in conjunction with which the same additional information is used.

The difference extraction unit 240 in the embodiment extracts transfer target content data to be transferred to the reproduction device 30 based upon the priority ranking results indicating the priority rankings of the individual sets of content data determined by the priority ranking determining unit 236. Namely, by referencing the priority ranking results during the transfer target content data extraction, the difference extraction unit 240 is able to extract content data ranked high in the priority order from the content data group as the transfer target.

In addition, the difference extraction unit 240 in the embodiment compares a first list indicating sets of first content data currently stored in the reproduction device 30 with a fourth list indicating the highest-ranked content data in the content data group, the overall volume of which matches the capacity of the reproduction device 30. Then, the difference extraction unit 240 extracts the content data included in the fourth list but not included in the first list as the transfer target content data. As the transfer management unit 244 transfers the transfer target content data thus extracted to the reproduction device 30, the reproduction device 30 is able to obtain content data with high priority rankings.

Moreover, the data management unit 330 in the embodiment is able to delete content data designated as deletion target content data, included in the first list but not included in the fourth list, from the storage unit 320.

It should be understood by those skilled in the art the various modifications, combinations, sub combinations and alterations may occur depending upon the design requirements and other factors insofar as they are within the scope of the appended claims or the equivalents thereof.

For instance, the types of additional information that may be utilized are not limited to those explained in reference to the embodiment. For instance, the inherent information may include a reproduction period indicating a limited period of time over which the subject content data can be reproduced, the names of actors if the subject content data are visual data or the names of artists if the subject content data are music data. The user setting information may include a keyword related to the subject content data set by the user, the history information may include the transfer date on which the subject content data were transferred from the PC 20 to the reproduction device 30 and the related information may include objective characteristics information related to the subject content data, which is obtained via the network 24 (an impact level, a targeted age group etc.), information indicating whether or not the specific set of content data is available on the network 24 or information indicating whether or not the specific set of content data is currently available free of charge.

In addition, a priority ranking criterion whereby a set of content data with an earlier transfer date, indicating that the content data were transferred to the reproduction device 30 at an earlier time, is ranked lower, a priority ranking criterion whereby a set of content data past its reproduction period is ranked lower, a priority ranking criterion whereby a set of content data available free of charge is ranked lower, a priority ranking criterion whereby a set of content data that can be obtained again on the network 24 is ranked lower or a priority ranking criterion whereby a set of content data with a greater data size is ranked lower may be adopted in the present invention.

Furthermore, a priority ranking criterion whereby a set of content data having been only partially reproduced on the PC 20 is ranked higher, a priority ranking criterion wherein a set of content data having been only partially transferred to the reproduction device 30 is ranked higher, or a priority ranking criterion whereby a combination of sets of content data, which will more efficiently utilize the capacity of the storage unit 320 at the reproduction device 30, are awarded higher rankings may be adopted in the present invention.

The priority ranking determining unit 236 may determine priority rankings of the individual sets of content data in a content data group that includes some of the content data stored in the PC 20 and some of the content data stored in the reproduction device 30. In this case, the priority ranking determining unit needs to rank only a smaller number of sets of content data and thus, the processing load for determining the priority rankings is minimized.

Moreover, it is not strictly necessary for the difference extraction unit 240 to compare the first list with the fourth list in order to extract the transfer target content data and the deletion target content data. For instance, the difference extraction unit 240 may designate all the content data currently stored in the reproduction device 30 as the deletion target and designate all the content data included in the fourth list as a transfer target. While content data will be deleted and recorded at the reproduction device 30 with higher frequency in this case, the processing load of the processing executed by the difference extraction unit 240 is minimized.

It is not strictly necessary to execute the various steps of the processing executed in the content transfer system 10 in the description in a time sequence by following the procedural sequence having been explained in reference to the flowcharts and the sequence diagram, and they may instead be executed concurrently or individually (e.g., parallel processing or object-based processing). In addition, the processing executed in the content transfer system described in the specification can be realized by configuring each of the various functional blocks in FIG. 3 in hardware.

The present invention also provides a program that enables a computer to execute communication through the communication method described above and a storage medium having stored therein the program.

What is claimed is:
1. A communication system, comprising:
a communication device; and
a reproduction device configured to carry out data communication with said communication device,
said reproduction device including a first storage unit configured to store content data items, and a first communication unit configured to communicate with said communication device, and said communication device including a second storage unit configured to store content data items, a second communication unit configured to communicate with said first communication unit, and a priority ranking determination unit configured to obtain a first list of content data items stored in said first storage unit and additional priority ranking information associated with each item of content data in the first list via the first and second communication units, obtain a second list of content data items stored in said second storage unit and additional priority ranking information associated with each item of content data in the second list, and determine an individual priority ranking of each item of content data in a content data group including both the content data items of the first list and the content data items of the second list, based on a priority ranking criteria and the additional priority ranking information associated with each item of content data in the first and second lists, wherein said communication device further includes a difference extraction unit configured to extract content data items from said second storage unit to be transferred to said reproduction device, based upon the individual priority ranking of each item of content data in the content data group.

2. A communication system according to claim 1, wherein the additional priority ranking information associated with each item of content data in the first and second lists includes data related to a plurality of priority ranking criteria, and said priority ranking determining unit is further configured to determine the individual priority ranking of each item of content data in the content data group by arranging each item of content data in the content data group in a priority order based upon at least one of the plurality of priority ranking criteria.

3. A communication system according to claim 1, wherein said communication device further includes a criteria storage unit configured to store a plurality of priority ranking criteria, and said priority ranking determining unit is further configured to determine the individual priority ranking of each item of content data in the content data group based upon a priority ranking criteria selected from the plurality of priority ranking criteria stored in said criteria storage unit.

4. A communication system according to claim 3, wherein the plurality of priority ranking criteria include at least one of a number of reproductions of a content data item, a date of recording of a content data item to a storage unit, a deletion indicator of a content data item, a user priority level of a content data item, a rating of a content data item, and a size of a content data item.

5. A communication system according to claim 3, wherein said priority ranking determination unit is further configured to determine a first priority ranking for each item of content data in said content data group based on a first of the plurality of priority ranking criteria and to determine a second priority ranking for each item of content data in said content data group based on a second of the plurality of priority ranking criteria.

6. A communication system according to claim 1, wherein said difference extraction unit is configured to extract content data items from said second storage unit to be transferred to said reproduction device based further upon a capacity of said first storage unit.

7. A communication system according to claim 1, wherein said communication device further includes a delete instruction unit to issue an instruction for said reproduction device to delete content data designated as a deletion target from said first storage unit, based upon the individual priority ranking of each item of content data in the content data group and a capacity of said first storage unit.

8. A communication system according to claim 2, wherein the additional priority ranking information includes inherent information attributable to characteristics of content data items.

9. A communication system according to claim 2, wherein the additional priority ranking information includes user-defined information of content data items.

10. A communication system according to claim 2, wherein the additional priority ranking information includes history information indicating a history of reproduction of content data items.

11. A communication system according to claim 2, wherein the additional priority ranking information includes metadata information obtained via a network.

12. A communication system according to claim 1, wherein the first list of content data items includes content data items different than content data items included in the second list.

13. A communication device that communicates with a reproduction device in which content data items are stored, comprising:

a storage unit configured to store content data items;

a communication unit configured to communicate with said reproduction device;

a priority ranking determining unit configured to obtain a first list of content data items stored in said storage unit and additional priority ranking information associated with each item of content data in the first list via the communication unit, obtain a second list of content data items stored in a second storage unit of said reproduction device and additional priority ranking information associated with each item of content data in the second list, and determine an individual priority ranking of each item of content data in a content data group including both the content data items of the first list and the content data items of the second list, based on a priority ranking criteria and the additional priority ranking information associated with each item of content data in the first and second lists; and a difference extraction unit configured to extract content data items from said storage unit to be transferred to said reproduction device, based upon the individual priority ranking of each item of content data in the content data group.

14. A communication device according to claim 13, wherein the additional priority ranking information associated with each item of content data in the first and second lists includes data related to a plurality of priority ranking criteria, and said priority ranking determining unit is further configured to determine the individual priority ranking of each item of content data in the content data group by arranging each item of content data in the content data group in a priority order based upon at least one of the plurality of priority ranking criteria.

15. A communication device according to claim 13, further comprising:
a criteria storage unit configured to store a plurality of priority ranking criteria, wherein said priority ranking determining unit is further configured to determine the individual priority ranking of each item of content data in the content data group based upon a priority ranking criteria selected from the plurality of priority ranking criteria stored in said criteria storage unit.

16. A communication device according to claim 15, wherein the plurality of priority ranking criteria include at least one of a number of reproductions of a content data item, a date of recording of a content data item to a storage unit, a deletion indicator of a content data item, a user priority level of a content data item, a rating of a content data item, and a size of a content data item.

17. A communication device according to claim 15, wherein said priority ranking determination unit is further configured to determine a first priority ranking for each item of content data in said content data group based on a first of the plurality of priority ranking criteria and to determine a second priority ranking for each item of content data in said content data group based on a second of the plurality of priority ranking criteria.

18. A communication device according to claim 13, wherein said difference extraction unit is configured to extract content data items from said second storage unit to be transferred to said reproduction device based further upon a capacity of said first storage unit.

19. A communication device according to claim 13, wherein said difference extraction unit is further configured to extract deletion target data based upon the individual priority ranking of each item of content data in the content data group and a capacity of said reproduction device.

20. A communication device according to claim 14, wherein the additional priority ranking information includes inherent information attributable to characteristics of content data items.

21. A communication device according to claim 14, wherein the additional priority ranking information includes user-defined information of content data items.

22. A communication device according to claim 14, wherein the additional priority ranking information includes history information indicating a history of reproduction of content data items.

23. A communication device according to claim 14, wherein the additional priority ranking information includes metadata information obtained via a network.

24. A non-transitory computer-readable storage medium storing computer readable instructions thereon that, when executed by an arithmetic processor, directs the arithmetic processor to execute a communication method, comprising:
obtaining a first list of content data items stored in a first storage unit of a communication device and additional priority ranking information associated with each item of content data in the first list;
obtaining a second list of content data items stored in a second storage unit of a reproduction device and additional priority ranking information associated with each item of content data in the second list;
determining an individual priority ranking of each item of content data in a content data group including both the content data items of the first list and the content data items of the second list based on a priority ranking criteria and the additional priority ranking information associated with each item of content data in the first and second lists; and
extracting content data items from said first storage unit to be transferred to said reproduction device, based upon the individual priority ranking of each item of content data in the content data group.

25. A communication method to be adopted in a communication device capable of communicating with a reproduction device in which content data items are stored, comprising:
obtaining a first list of content data items stored in a first storage unit of said communication device and additional priority ranking information associated with each item of content data in the first list;
obtaining a second list of content data items stored in a second storage unit of said reproduction device and additional priority ranking information associated with each item of content data in the second list;
determining, by a processor of said communication device, an individual priority ranking of each item of content data in a content data group including both the content data items of the first list and the content data items of the second list based on a priority ranking criteria and the additional priority ranking information associated with each item of content data in the first and second lists; and
extracting content data items from said first storage unit to be transferred to said reproduction device, based upon the individual priority ranking of each item of content data in the content data group.

* * * * *